(No Model.) 2 Sheets—Sheet 1.

W. E. NICKERSON & A. BERRENBERG.
AIR TENSION GAGE.

No. 450,795. Patented Apr. 21, 1891.

WITNESSES.
Frank G. Parker
William Edson

INVENTORS
William E. Nickerson
Adolph Berrenberg (No Model.) 2 Sheets—Sheet 2.

W. E. NICKERSON & A. BERRENBERG.
AIR TENSION GAGE.

No. 450,795. Patented Apr. 21, 1891.

WITNESSES
Frank H. Parker
William Edson

INVENTORS.
William E. Nickerson
Adolph Berrenberg

UNITED STATES PATENT OFFICE.

WILLIAM E. NICKERSON, OF CAMBRIDGE, AND ADOLPH BERRENBERG, OF SOMERVILLE, MASSACHUSETTS, ASSIGNORS TO THE BEACON VACUUM PUMP AND ELECTRICAL COMPANY, OF PORTLAND, MAINE.

AIR-TENSION GAGE.

SPECIFICATION forming part of Letters Patent No. 450,795, dated April 21, 1891.

Application filed June 20, 1890. Serial No. 356,106. (No model.)

*To all whom it may concern:*

Be it known that we, WILLIAM E. NICKERSON, of Cambridge, and ADOLPH BERRENBERG, of Somerville, both in the county of Middlesex and State of Massachusetts, have invented new and useful Improvements in Air-Tension Gages, of which the following, taken in connection with the accompanying drawings, is a specification.

The object of our invention is to make an instrument for measuring the degree of attenuation produced in a vacuum-chamber when the air-tension in such chamber is so small as not to be indicated by the manometer now in use.

Our instrument is intended to be supplemental to the ordinary manometer.

The construction of this instrument is illustrated in the accompanying drawings, in which—

Figure 1:
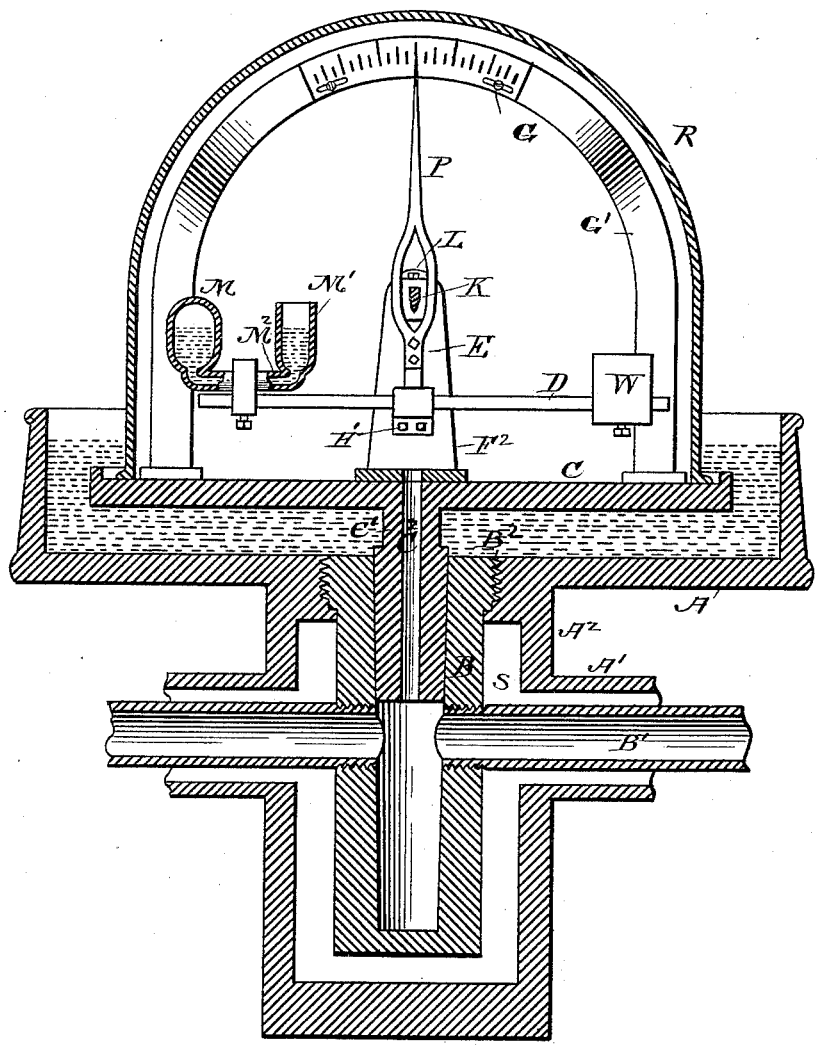
Figure 2:
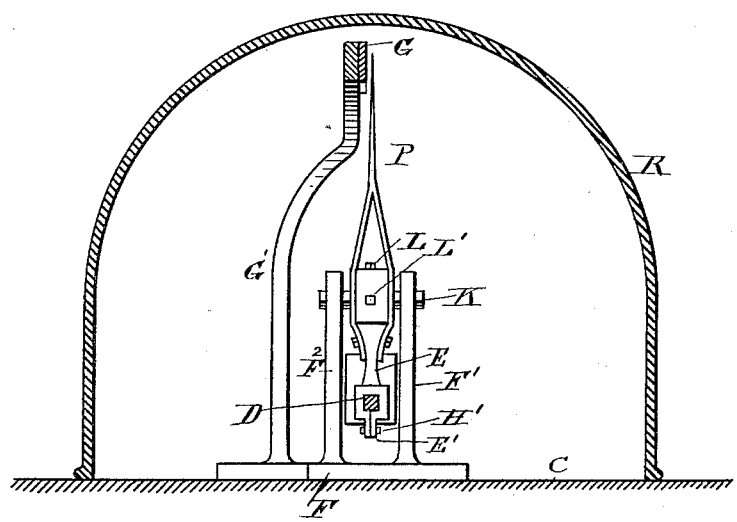
Figure 3:
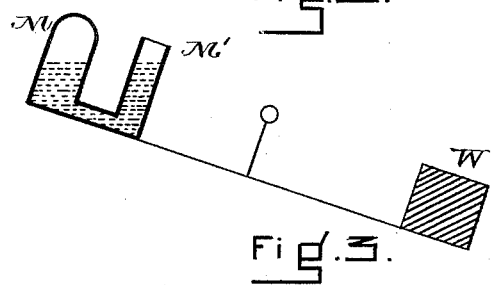
Figure 4:
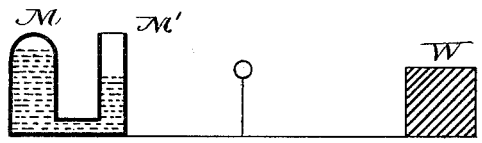
Figure 5:
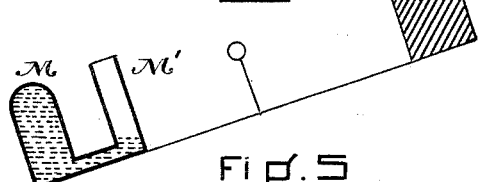

Figure 1 is a view showing the instrument and its connections partly in vertical section and partly in elevation. Fig. 2 is a view, the plane of which is taken at right angles to the one in Fig. 1. This view shows the upper part of the instrument only. Figs. 3, 4, and 5 are diagrams for illustration of the method of working.

In the drawings, the pipe B' in the jacket-pipe A' leads from the article to be exhausted to the jacketed socket B, which is surrounded by the jacket A², the jacketing-space being indicated by S, Fig. 1, and may be a vacuum, or filled with oil, airless or not, as may be desired.

A represents a flat open vessel for the reception of oil or other sealing-liquid. This vessel may be integral with the part A² or may be made separately and attached to it. The socket-piece B is attached to the vessel A by a screw-thread at B², as shown.

C is a plate attached to a spindle C'. A passage C² extends through the spindle C' and serves to connect the vacuum-pipe B' to the interior of the receiver R, which rests upon the plate C and with it forms a vacuum-chamber.

D is a rod having at one end a weight W and at the other two bulbs M M', containing some fluid—mercury, for instance. A passage through the rod M² connects the chambers within the bulbs M M', so that the contents may flow from one chamber to the other. The balance D W M M' is mounted on a knife-edged pivot-bar K, so that it is free to swing a limited distance in a vertical plane.

The mounting may be described as follows: The saddle-piece E is cut vertically by a kerf, as shown in Fig. 2, so that by turning the screws H' in the clamping direction the two parts E and E' are made to firmly embrace the rod D. The knife-edged bar K is secured in the upper end of the saddle-piece E by means of the set-screw L' and the adjusting-screws L. The standards F' F² are connected to a base-piece F, which is secured by screws or otherwise to the plate C, and support suitable bearings for the knife-edges on the bar K. An index-hand P is attached to the saddle-piece E and moves over a graduated arc G, adjustably attached to the supporting-arc G'.

The operation of our vacuum-gage is as follows: The bulbs M and M' are so arranged that when the vacuum-bulb M is full of mercury and the open bulb M' with but little in it and is under atmospheric pressure, then the weight W is sufficient to hold the beam D in the position indicated in the diagram 5, but not sufficient to hold the beam level. Now, if a partial vacuum is formed in the receiver R mercury will flow, caused by the reduction of the air-pressure, from the bulb M to the bulb M'. This movement of the mercury will cause the center of gravity of the mass of mercury to approach the fulcrum of the beam D, lessening its leverage, so that the beam D will, through the weight W, as the exhausting continues, turn toward the horizontal position indicated in Fig. 4. A further exhaustion will cause more mercury to leave the bulb M and flow into the bulb M'. This will move the center of gravity of the mass of mercury still nearer the fulcrum and cause the beam to approach the position shown in Fig. 3. The balance is so adjusted in relation to the graduated scale that if a perfect vacuum is attained in the receiver the pointer P will stand at a point on the scale that shall indicate the fact. The division may be made, if desirable, to run from zero, indicating a perfect vacuum, to one hundred, indicating a determined atmospheric pressure.

The essential feature of this invention is indicating the air-tension by an index-controlling weight, the functional value of which depends on the air-tension.

I claim—

In connection with an exhaust device, a receiver interiorly connected to the articles to be exhausted, in combination with an oscillating balance inclosed within said receiver, said balance being actuated by a mercurial weight the center of gravity of which is made to approach or recede from the fulcrum of the balance by the tension of the air in the exhaust device, substantially as and for the purpose set forth.

WILLIAM E. NICKERSON.
ADOLPH BERRENBERG.

Witnesses:
FRANK G. PARKER,
WILLIAM EDSON.